No. 640,292. Patented Jan. 2, 1900.
H. A. FRASCH.
APPARATUS FOR CONTINUOUS FRACTIONAL DISTILLATION OF HYDROCARBONS.
(Application filed Oct. 23, 1896.)
(No Model.) 2 Sheets—Sheet 1.

Witnesses. Inventor

No. 640,292. Patented Jan. 2, 1900.
H. A. FRASCH.
APPARATUS FOR CONTINUOUS FRACTIONAL DISTILLATION OF HYDROCARBONS.
(Application filed Oct. 23, 1896.)
(No Model.) 2 Sheets—Sheet 2.

Witnesses.
J. F. Coleman
Nellie Callahan

Inventor
Hans A. Frasch,
by Wm. H. Linerel
Atty

UNITED STATES PATENT OFFICE.

HANS A. FRASCH, OF NEW YORK, N. Y.

APPARATUS FOR CONTINUOUS FRACTIONAL DISTILLATION OF HYDROCARBONS.

SPECIFICATION forming part of Letters Patent No. 640,292, dated January 2, 1900.

Application filed October 23, 1896. Serial No. 609,837. (No model.)

*To all whom it may concern:*

Be it known that I, HANS A. FRASCH, a citizen of the United States, residing at New York, in the county of New York and State of New York, have invented a certain new and useful Improvement in Apparatus for the Continuous Fractional Distillation of Hydrocarbons, of which the following is a full, clear, and exact description.

The object of this invention is to provide for the separation from a body of high boiling-point of another body or bodies of lower boiling point or points—as, for example, separation by volatilization of a solvent from the solution made by it.

The invention, as will presently appear, is applicable generally to the separation of the volatile constituents of hydrocarbons by a process of continuous fractional distillation, and the concrete specific use to which the invention has already been successfully applied is the freeing of a solution of bitumen or asphalt in benzin from the solvent and the recovery of the solvent thus applied.

Without thereby limiting the invention I will describe it as applied to the liberation of benzin from a solution of bitumen or asphalt obtained in the manner set forth in and forming the subject of my Patent No. 581,546, dated April 27, 1897.

In carrying out my invention I make use of a column-still, consisting of shells having continuous communication from one to the other at alternate ends and over flanges which retain a quantity of the fluid, whereby the fluid to be treated may descend from shell to shell in a thin film-like stream, so as to get the greatest expanse of evaporating-surface, each shell having a heating-coil arranged in its bottom and supplied with steam heat under regulated pressure, the steam being circulated by manifolds and a manifold connected with each alternate shell to take off the vapors from two adjacent shells. The bottom shell has an outward open extension, into which the heating medium extends, so as to keep the material therein in a fluid condition, such extension being separated from the main body of the shell by a bridge, which dips down into the fluid and forms a vapor-seal, and the extension also being supplied with an overflow.

Figure 1:
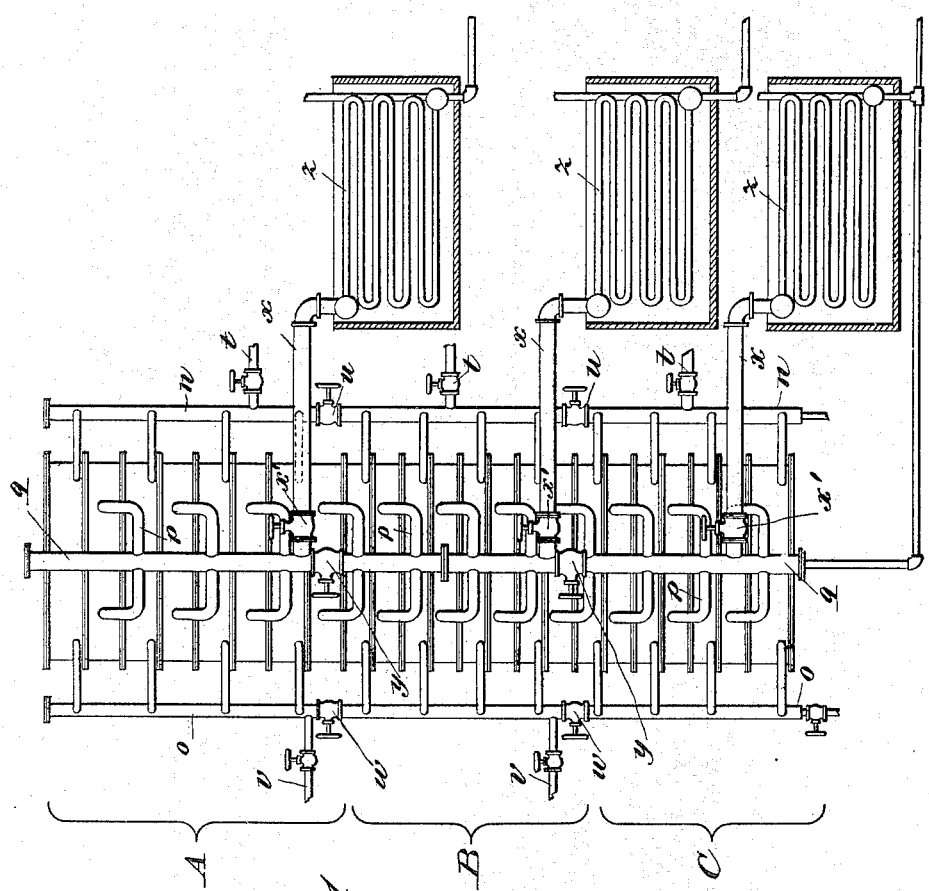
Figure 2:
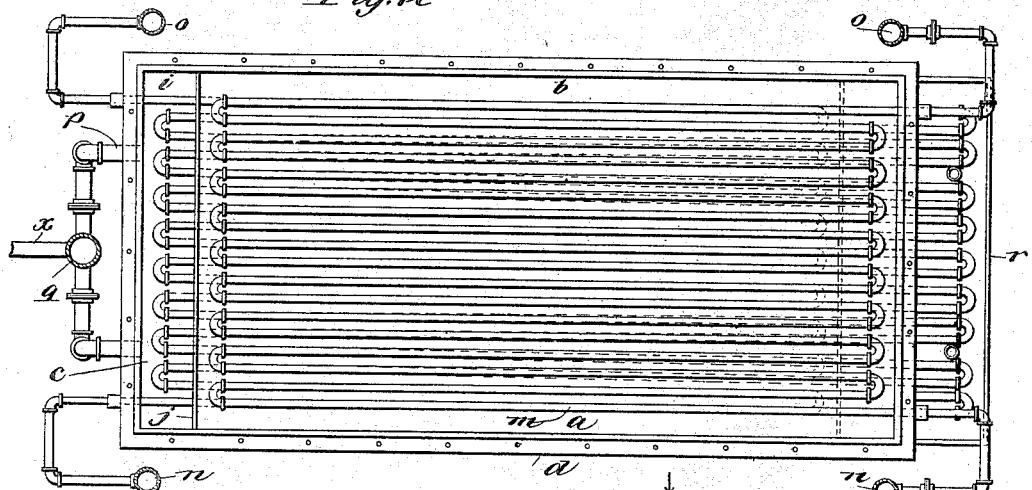
Figure 3:
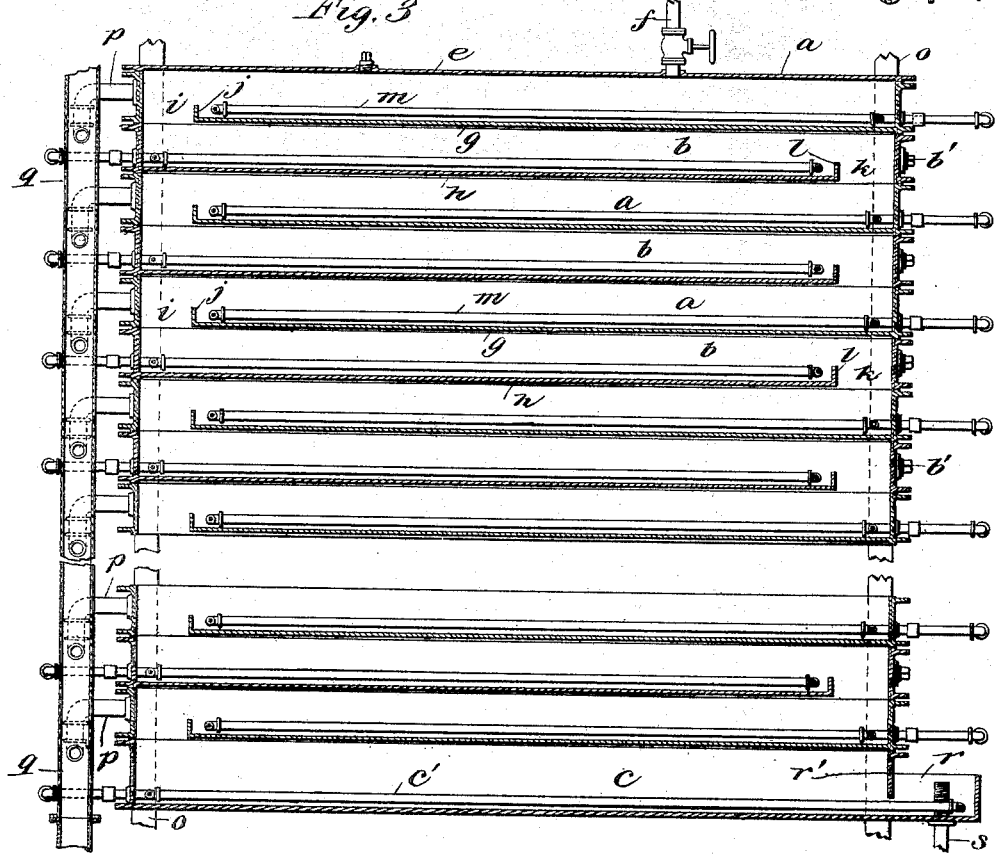

In the accompanying drawings, illustrating my invention, in the several figures of which like parts are similarly designated, Figure 1 is an elevation and partial section of an apparatus for carrying out my invention. Fig. 2 is a plan view, with the cover removed, of the bottom shells or pans of the apparatus; and Fig. 3 is a vertical section of a portion of the apparatus, showing the tortuous passage for the flow of the fluid.

The still or column is composed of three kinds of shells or pans, which are designated, respectively, $a$, $b$, and $c$. These shells or pans are substantially alike, and their differences will be pointed out in the progress of this specification. All the pans are alike in being composed of rectangular frames having laterally-projecting flanges $d$ all around, by means of which flanges the superposed sections may be bolted together to form a column. The uppermost shell or pan is provided with a cover $e$, which is supplied with an inlet $f$, by which the substance to be treated is introduced into the apparatus at the top. The pans $a$ and $b$ are provided with imperforate bottoms $g$ $h$, which are alike excepting that the bottom $g$ of the pan $a$ ends, as in Fig. 3, short of the left-hand end to form a transverse passage $i$ from the upper pan $a$ to the lower pan $b$, the bottom having a vertical flange $j$ to provide for a certain depth of fluid in the pan at all times during the progress of the operation, and the bottom of the pan $b$ ends short of the right-hand end of the pan to form the transverse passage-way $k$ between the said pan $b$ and the pan $a$, situated immediately below it, the bottom of pan $b$ ending in a vertical flange $l$ for the same purpose as the flange $j$ of pan $a$. In this way a tortuous passage is formed throughout the column of shells or pans and communication is afforded not only for the descending fluid, but also for the ascending vapors throughout the column. Each pan is provided with a coil of heating-pipes $m$, laid on its bottom and standing thereupon to the height of the overflow-flanges $j$ and $l$. These coils of pipes are designed to receive heat. Steam is introduced into opposite ends of the column at every alternate pan or shell and similarly exhausted therefrom. To this end $n$ $n$ are manifolds for the live steam, said manifolds being arranged at opposite ends of the column and having suitable pipes connecting the one at one end with the pans $a$ and the other at the other end with the pans $b$, and $o$ $o$ are manifolds similarly disposed at opposite ends and on opposite sides of the column for the reception of the exhaust-steam. For convenience the manifolds $n$ will be referred to as the "inlets" and the manifolds $o$ will be referred to as the "returns."

Inasmuch as the shells or pans $a$ and $b$ are arranged in pairs and communicating it will be sufficient to provide the pans $a$ of the pairs with a vapor-outlet, by means of which the vapor arising in the pairs may be led away, and for the purpose of recovering this vapor downwardly-bent pipes $p$ are connected with the manifold $q$, and this manifold may have an outlet into any suitable receiver or condenser.

The pan $c$ has a continuous closed bottom and is supplied with a heating-coil $c'$, which is supplied with steam from one of the manifolds $n$ and connected with one of the returns $o$. The pan $c$ differs from the other pans in having an external trough $r$, into which the heating-coil is projected, and this trough is supplied with the overflow-pipes $s$, by means of which the concentrated solution from which the solvent has been extracted is conveyed away to suitable storage-receptacles. I prefer to elevate the discharge-pipes $s$ considerably above the bottom of the trough $r$ and the bridge $r'$ in order to obtain a sealed outlet, which prevents vapor from leaving the still, but permits the discharge of the nonvolatilized fluid. Furthermore, by having the trough $r$ close up to and outside of the column and by having the heating apparatus extending into it the matter treated is kept in fluid form and is constantly before the operator for inspection as to density and for ascertainment of the condition or the progress of the process being carried on in the apparatus.

The apparatus as just described is designed to effect the separation of two bodies or substances—as, for example, confining the specification to the single instance selected, to the liberation and recovery of the volatile solvent used in the extraction of bitumen or asphalt from rock. The fluid solution is introduced into the still at the top, and the still is heated to a temperature equal to or about equal to the boiling-point of the solvent and certainly less than the boiling-point of the bitumen, and as the fluid overflows the successive flanges $j$ and $k$ its exposure to the heat of the steam-coils effects the liberation of the solvent, which escapes through the pipes $p$ into the manifold $q$, while the bitumen or asphalt becomes more and more concentrated as it progresses to the bottom of the still.

Should it be desired to treat a substance containing more than one volatile body—for instance, two or three such bodies the boiling-points of which are different—then by a simple arrangement of valves the still may be arranged so that it may be divided into several groups of shells or pans and their heating-coils, to which steam at different pressures, and hence at different temperatures, may be supplied, the steam of lowest pressure and temperature being supplied to the uppermost group, and steam of higher pressure and temperature to the next lower group, and superheated steam or steam of highest pressure and temperature to shells of the lowest group. Fig. 1 illustrates my apparatus equipped for such operation, the shells or pans included within the bracket A constituting one group, the shells or pans within the bracket B constituting the second group, and those included within the bracket C constituting the third group. The steam-inlet manifolds are provided with as many valved steam-induction pipes $t$ as there are sections, and the said manifolds are also provided in themselves with the cocks $u$, which divide the manifold into compartments containing different steam-pressures and render it possible to use the manifold as a single compartment. The steam-return pipes are provided with separate valved waste-pipes $v$ and the cocks $w$, which latter separate the manifold $o$ into as many compartments as there are in the manifold $n$. The vapor-manifold $q$ is provided with a condenser-outlet $x$ for each group of shells, and it is also supplied with a cock $y$ for each of the two uppermost groups. The pipes $x$ lead into independent condensers $z$, from which the condensed solvent may be recovered.

Now with an apparatus equipped as is that shown in Fig. 1 it is obvious that by properly manipulating the valves the whole column may be utilized for the separation of simply two bodies, while on the other hand it may be utilized for the separation of three or of four bodies, and this facility for the separation of a number of bodies contained in a given substance, which bodies are liberated by the application of heat appropriate to their respective boiling-points, renders my invention especially valuable in the treatment of complex hydrocarbons.

The manifolds may be provided with pressure-gages, so that the temperatures in the several compartments may be figured from the pressures indicated by the respective gages.

The condenser-pipes $x$ are supplied with the valves $x'$ in order that any one or more of the condensers may be used.

The shells or pans being made in pairs, access may be had to the two pans of a pair through the plugged openings $b'$ of the shells $b$ for cleaning or inspecting and for other purposes.

The invention is not restricted to use in connection with the substances particularly mentioned, and hence I desire to be understood as covering the invention generally as it may be or may be found to be applicable to the liberation of volatile solvents from substances generally.

Instead of using coils for heating the pans or shells I may construct such pans or shells with double bottoms or with hollow bottoms, and, indeed, any well-known appliances for introducing indirect steam heat may be utilized.

What I claim is—

1. In a distilling-column, consisting of a series of communicating shells, a manifold connected with alternate shells to receive the vapor from every two shells, and means for conducting away the separate vapors at several desired points to separate condensers, and a bottom shell having an open outlet and a vapor-seal at the base of the column of shells, substantially as described.

2. A series of communicating shells, each having an overflow into the shell next below, a heating medium in the bottom of each shell, a manifold communicating with alternate shells to receive the vapor from that shell and the one immediately beneath it, and a bottom shell having a bridge projecting down into the fluid in the shell, the said shell having an outward open extension into which the heating medium also extends, and an overflow, substantially as described.

3. In a distilling apparatus composed of a number of superposed sections or shells, a bottom section having the open outwardly-projecting outlet and a vapor-seal adjacent said outlet, substantially as described.

In testimony whereof I have hereunto set my hand this 16th day of October, A. D. 1896.

HANS A. FRASCH.

Witnesses:
HENRY A. TOBELMAN,
F. STORER BROWN.